United States Patent [19]

Monroe

[11] 4,449,047

[45] May 15, 1984

[54] AIRBORNE MINERAL EXPLORATION SYSTEM

[75] Inventor: John N. Monroe, Waco, Tex.

[73] Assignee: Sunoco Energy Development Co., a wholly-owned subsidiary of Sun Company, Inc., Dallas, Tex.

[21] Appl. No.: 315,330

[22] Filed: Oct. 26, 1981

[51] Int. Cl.³ .................. G01V 5/00; G01N 21/64
[52] U.S. Cl. ................................. 250/253; 250/461.1
[58] Field of Search ............... 250/253, 458.1, 459.1, 250/461.1

[56] References Cited

U.S. PATENT DOCUMENTS

| | | | |
|---|---|---|---|
| 3,043,908 | 7/1962 | Madsen | 250/253 |
| 3,501,639 | 3/1970 | Monroe | 250/461.1 |
| 3,527,533 | 9/1970 | Hook et al. | 250/253 |
| 3,663,814 | 5/1972 | Madsen | 250/253 |
| 3,736,428 | 5/1973 | Monroe | 250/461.1 |
| 4,236,071 | 11/1980 | Chimenti | 250/461.1 |
| 4,247,770 | 1/1981 | Welch | 250/253 |

Primary Examiner—Janice A. Howell
Attorney, Agent, or Firm—J. Edward Hess; Donald R. Johnson; James H. Phillips

[57] ABSTRACT

In order to achieve airborne exploration for minerals in which both color and size information is obtained from fluorescing targets, a pulsed ultraviolet source is directed downwardly from the aircraft to a target area, and light from any responsively fluorescing discrete target is passed through receiving optics which includes a plurality of choppers of different fineness. A multiply-chopped signal is passed through a light pipe which includes filters to separate the signal into a plurality of electronic channels according to the respective color components. Signals are further processed by division into a plurality of parallel paths according to chopper frequency and applied to a series of integrators which are specially configured to remove noise from several sources to markedly improve the signal to noise ratio. The data thus obtained is stored, along with time and position information, onto conventional digital recording means for subsequent retrievel and analysis. In a preferred embodiment, a pulsed ultraviolet light source is employed which continuously illuminates a large width, narrow depth target area in conjunction with an array of light pipes in the receiving optics of which each light pipe in the array monitors only a portion of the illuminated target area. Alternatively, a scanning ultraviolet source may be employed.

6 Claims, 17 Drawing Figures

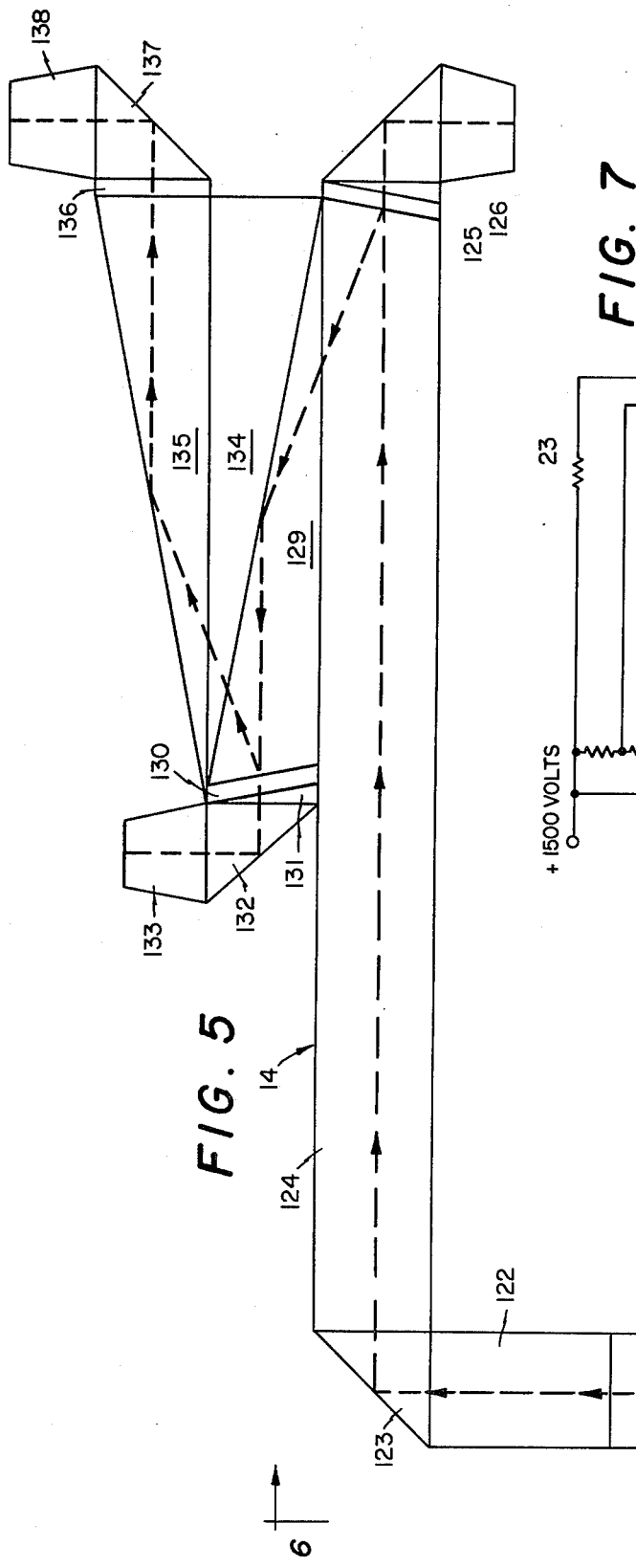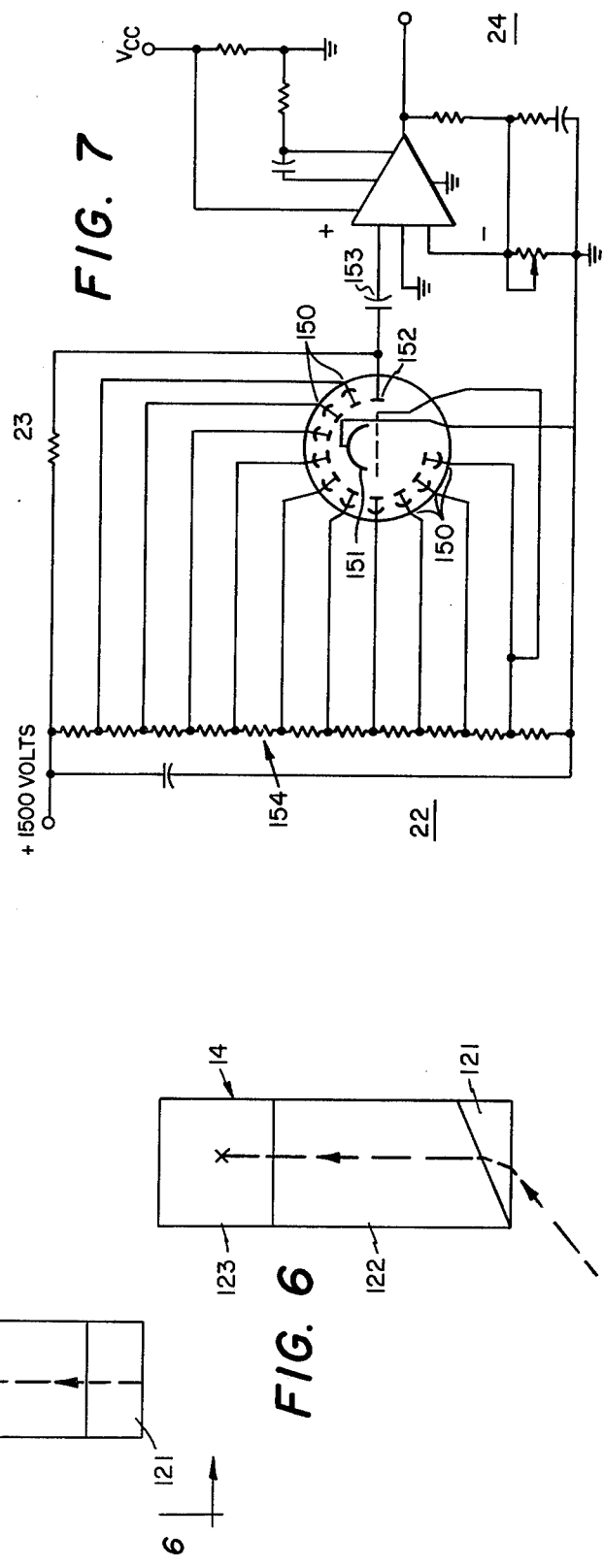

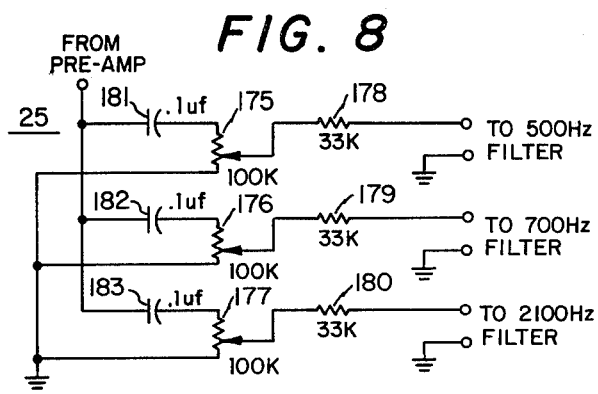
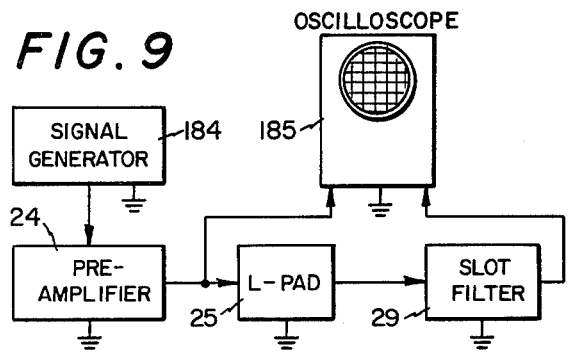
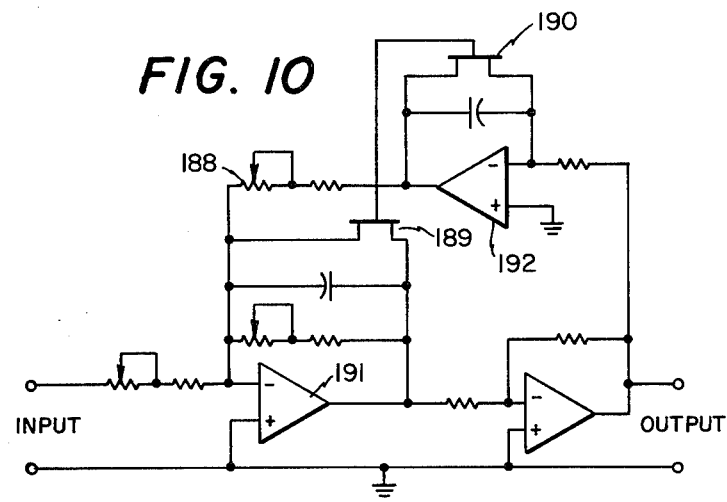
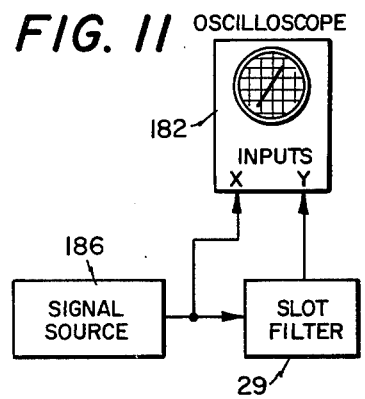
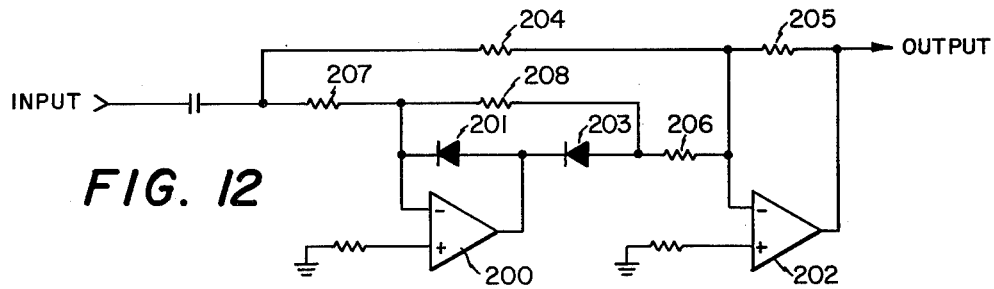
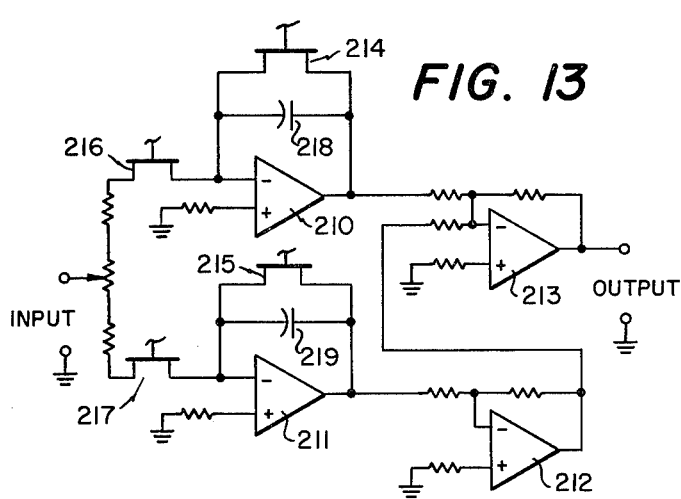
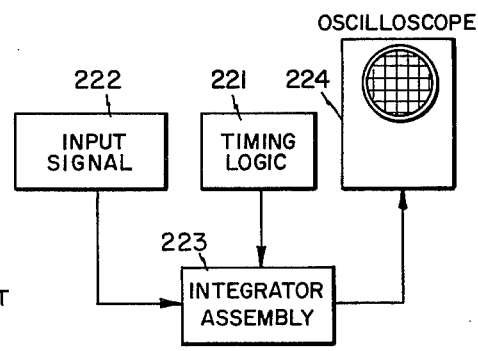

AIRBORNE MINERAL EXPLORATION SYSTEM

BACKGROUND OF THE INVENTION

A number of system approaches for carrying out airborne exploration for minerals have been contemplated, proposed and practiced heretofore. One system approach of substantial promise has been the use, in a night flying aircraft, of an ultraviolet source to illuminate a target area below the aircraft, the means for sensing any responsive fluorescence in the visible spectrum within the target area. It is well known that many minerals fluoresce in response to stimulation by ultraviolet light, and this principle has been used for many years by geologists and other prospectors carrying hand held instruments at close range to the target.

However, the use of this basic exploration approach in night flying airborne systems, which manifestly offers, theoretically, greatly increased territorial coverage, has not been particularly successful in practice because of the considerable problems of bringing enough ultraviolet energy to bear on a target area of an aircraft and the counterpart problem of somehow sensing the resultant faint fluorescent targets of interest while rejecting other light sources which constitute mere noise and may be overwhelmingly of greater magnitude than the desired target.

Thus, bona fide efforts have been made in the past to realize such an airborne exploration system employing ultraviolet stimulation of fluorescence of desired target minerals. One of the earliest methods employing this system approach is discussed in my U.S. Pat. No. 3,736,428, entitled "Detecting with Ultraviolet Light", issued May 29, 1973. It may be noted that the issuance of this patent was delayed for some years for national security reasons such that the disclosure thereof pertains to work conducted by me in the 1950's. A similar, slightly later system, is disclosed in U.S. Pat. No. 3,043,908 to Madsen, entitled "Fluorographic System for Aerial Surveys", issued July 10, 1962. An improvement to the Madsen system is disclosed in U.S. Pat. No. 3,663,814, entitled "System for Delineating Selective Response of a Material to Radiation in Presence of Visible Illumination", issued May 16, 1972. A more recent patent disclosing a system employing the basic approach of a pulsed ultraviolet source (employing a laser) in conjunction with sensor optoelectronics system is U.S. Pat. No. 4,236,071, entitled "Detection of Uranium by Light Induced Luminescence", issued Nov. 25, 1980, to Chimenti.

None of these systems collect as much data as may be necessary to efficiently carry out the desired exploration for a wide variety of minerals. It is desirable to know the color "signature" of a fluorescing material and the target size. Further, the sensitivity of these prior art systems has been sufficiently low to require, as a practical matter, relatively low level, and hence dangerous, night flying operations. It will therefore be readily apparent to those skilled in the art that it would be highly desirable to provide a mineral exploration system of the class in which airborne exploration may be carried out from a safe height while collecting adequate data to determine the color characteristics, size, and location of fluorescing targets while rejecting, effectively, noise in the form of non-fluorescing or reflected light.

OBJECTS OF THE INVENTION

It is therefore a broad object of my invention to provide an improved airborne mineral exploration system.

It is a more particular object of my invention to provide an improved airborne exploration system of the class employing a pulsed ultraviolet source for stimulating fluorescence in target minerals and including means to sense and record fluorescence in the visible spectrum.

It is still a more specific object of my invention to provide means, in such an airborne exploration system, to sense and record data from which the color signature and size class of the sensed targets may be obtained.

SUMMARY OF THE INVENTION

Briefly, these and other objects of the invention are achieved by providing a pulsed ultraviolet source in conjunction with receiver optics and electronics which divide the incoming signal spatially laterally of the flight of the aircraft and, for each spatial plot, into blue, green and red signal components for downstream processing. The incoming visible light signal is also chopped at three frequencies by three chopper belts of different fineness to provide size discrimination information. Within each color subchannel of each spatial plot channel, the three chopped frequencies are individually passed through slot filters and precision rectified to provide a d-c output signal instantaneously analogous to the signal fraction attributable to the correspondingly sized targets. The d-c signal is integrated over a period of cycles in synchronism with the on-off cycles of the ultraviolet light source in order that the noise component (the output from the precision rectifier during the off period) may be subtracted from the signal plus noise component to obtain an output signal representative of the input signal with the noise removed. The output signal is applied to data gathering, converting and storage equipment for downstream analysis and utilization.

DESCRIPTION OF THE DRAWING

The subject matter of the invention is particularly pointed out and distinctly claimed in the concluding portion of the specification. The invention, however, both as to organization and method of operation may best be understood by reference to the following description taken in connection with the subjoined claims and the accompanying drawing of which:

FIGS. 5 and 6 are, respectively, side and partial end views of one of a series of light conduits employed in the system of FIG. 1;

FIG. 7 is a schematic of one exemplary photomultiplier tube with its following low lever differential amplifier, representative of a plurality of such circuits employed in the system of FIG. 1;

FIG. 8 is a schematic of an exemplary attenuator unit employed in the system of FIG. 8;

FIG. 9 illustrates a test set up for adjusting the attenuator circuit of FIG. 8;

FIG. 10 is a schematic of an exemplary slot filter employed in the system of FIG. 1;

FIG. 11 illustrates a test set up for adjusting the slot filter of FIG. 10;

FIG. 12 is a schematic of an exemplary precision rectifier circuit employed in the system of FIG. 1;

FIG. 13 is a schematic of an exemplary integrator unit employed in the system of FIG. 1;

FIG. 14 illustrates a test set up for adjusting the integrator unit illustrated in FIG. 13;

DETAILED DESCRIPTION OF THE INVENTION

Figure 1:
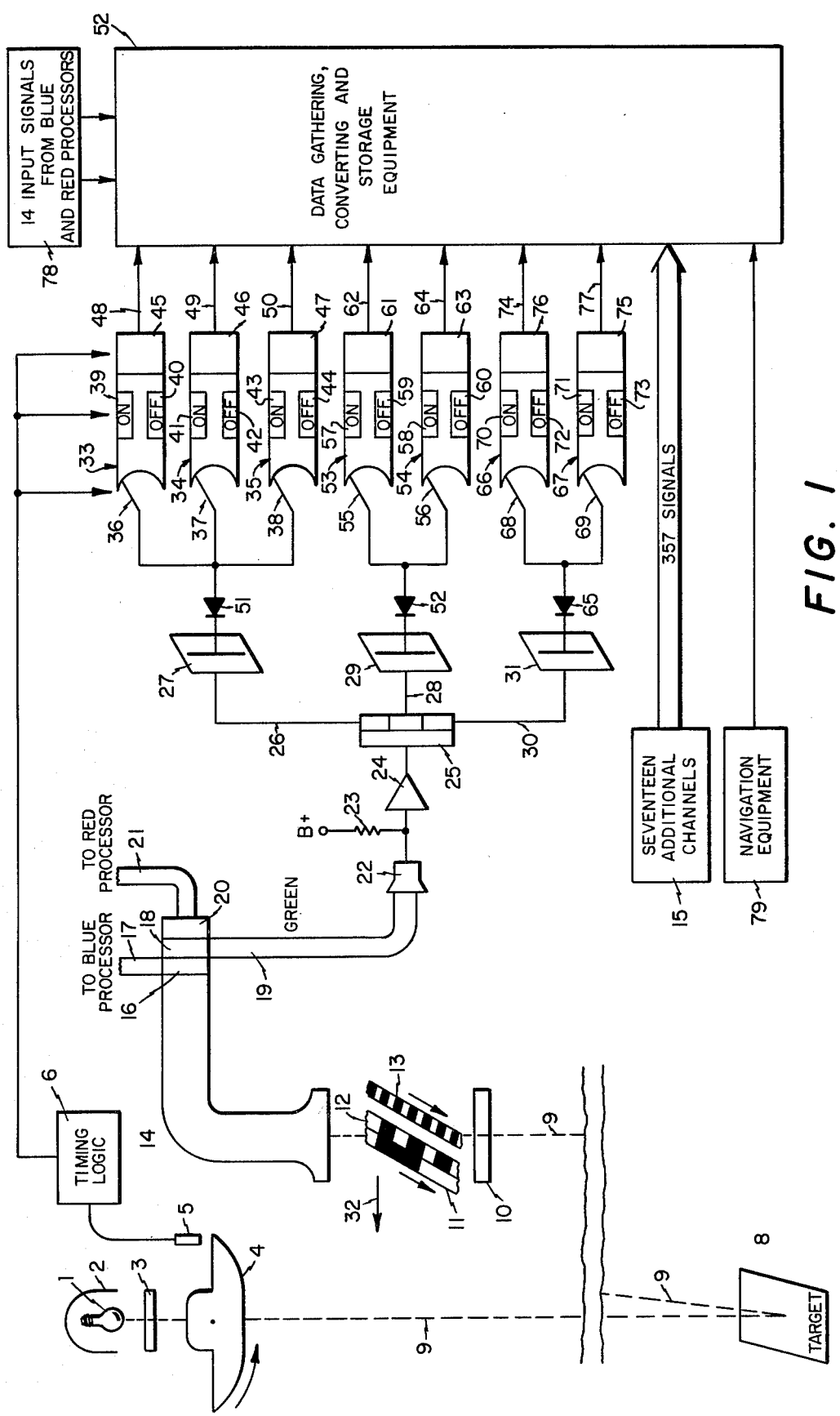
FIG. 1 is a simplified schematic representation of the system incorporating the present invention.

FIG. 1 is a major block diagram illustrating a system incorporating the present invention. The system includes airborne transmitting, receiving, and signal processing apparatus for sensing the existence of minerals, within the field of view, on the earth's surface below, which fluoresce in response to ultraviolet stimulation. Light from a source 1 which is rich in ultraviolet energy (e.g., a mercury vapor lamp) is directed by a reflector 2 through an optical filter 3 (having unique characteristics and construction to be described in detail below) which serves to block the transmission of light components in the visible portion of the spectrum. A motor driven shutter 4, rotating on the order of 2400 rpm, alternately blocks and allows to pass the ultraviolet light which passes through the filter 3. The criteria which sets the actual speed range of the shutter 4 will be discussed in detail below. A sensor 5 is employed to monitor the position of the shutter 4 in order to obtain an input to timing logic 6 indicative of transmission or non-transmission ("on/off") of the ultraviolet light to the earth's surface below.

Thus, the transmitter apparatus serves to direct a pulsating (on/off) beam 7 of ultraviolet light downwardly to impinge on the earth's surface. As will be discussed more fully below, the shape of the downwardly directed beam (obtained by a special configuration of the reflector 2, also to be discussed below) is narrow in the direction of the aircraft travel and spans outwardly for some distance on each side of the aircraft. By way of example, for an aircraft flying at an altitude of 2,000 feet, the optics of the transmitting system preferably achieves an area of impingement at the surface on the order of 166 feet in the direction of travel of 1,000 feet to each side of a position directly beneath the aircraft.

A target 8, stimulated to fluoresce in synchrony with the pulsations of the ultraviolet beam 7, emits visible light represented by the line 9. The visible light from the target 8 is collected by a lens 10 which serves as the input element to the receiving and processing apparatus carried by the aircraft. The light from the target 8 then passes sequentially through each of the three chopper belts 11, 12, 13 (which are disposed at the focus of the lens 9) as the aircraft travels in the direction indicated by the arrow 32 with respect to the target 8. The necessity for employing three chopper belts and the particular construction and characteristics of each will be discussed in detail below. For an understanding of FIG. 1, it need only be appreciated that coarse 11 and medium 12 chopper belts are driven at the same linear speed and chop the incoming light (in equal pass/no pass increments) at 700 Hz and 2100 Hz, respectively, whereas the fine chopper belt 13 is driven more slowly to obtain a chopped frequency of 500 Hz. Additionally, it may be noted that the chopper belts are actually arrayed parallel to the plane of the lens 10 and generally (but not necessarily exactly) normal to the direction of travel. The angular orientation employed in FIG. 1 is merely for convenience in illustration.

The light from the target 8, having been sequentially chopped at three different frequencies, is applied to the input optics of an array of eighteen light pipes exemplified by the single inlet pipe 14 shown in FIG. 1. The light pipes, of unique character and construction to be described in detail below, have their input optics aligned side by side in an arrangement which is the counterpart to the width of the field of view impinged upon by the pulsating ultraviolet light beam 7 on the earth's surface below. Thus, the single light pipe 14 feeds into the single channel of optical and electronic apparatus illustrated in FIG. 1, and it will be understood that seventeen additional and identical channels, represented by the block 15, are in simultaneous operation.

As the instantaneously received light from the target 8 passes through the light pipe 14, it first encounters a blue light (3900–4700 angstroms) interference filter 16 which passes any blue light component of the signal through a branch 17 to a blue light processor (not shown in FIG. 1). The remaining light signal next encounters a green light (4700–5500 angstroms) interference filter 18 which passes any green light component of the signal through a branch 19 to the photocathode of a photomultiplier tube 22. Finally, a red light absorption filter 20, having a cut-on characteristic in the region 5500–5800 angstroms, passes any red component of the signal through a branch 21 to a red processor (not shown in FIG. 1). Any remaining light that does not pass through the red filter 20 is absorbed by it.

The blue and red processors which receive light signals through the light pipe branches 17 and 21 are identical to the green light processor to be explained in the following passage and therefore are omitted from FIG. 1 in the interest of clarity.

As will be explained more fully below, photons from any green component of an instantaneous chopped light signal arriving at the photocathode of the photomultiplier tube 22 will result in current pulses appearing at the anode of the photomultiplier tube. These current pulses are developed across anode load resistor 23 to provide voltage pulse signals which are a-c coupled to a low noise preamplifier 24. Preamplifier 24 has a bandpass on the order of 460–2140 Hz to raise the level of any 500, 700, and 2100 Hz signal components present while eliminating signal components outside the passband which constitute noise.

The output from the preamplifier 24 is applied to a passive attenuator unit 25 whose principal functions are to closely equalize the grain of the preceding circuitry and to provide isolation between the meaningful signal components at the three separate frequencies (500, 700, and 2100 Hz) because these components are treated separately in the succeeding circuitry. A first output 76 from the attenuator 25 is coupled to the input of a 500 Hz electronics slot filter 27. Similarly, a second output 28 from the attenuator 25 is coupled to the input of a 700 Hz slot filter 29, and a third output 30 from the attenuator 25 is coupled to the input of a 2100 Hz slot filter 31. The slot filters 27, 29, and 31 (to be described in detail below) are high Q, narrow band analog units or narrow band digital units which serve to effectively eliminate all signals and noise outside their respective nominal tuned frequencies.

The output signal from the 500 Hz slot filter 27 is applied to a precision rectifier 51 to obtain a negative d-c signal analogous to the green component of the light 9 from the fluorescence of the target 8 as it is instantaneously chopped by the fine belt 13. The d-c signal is coupled to an array of three integrator units 33, 34, 35, disposed in parallel. The integrator units 33, 34, 35 include respective electronic switches 36, 37, 38 which, under the influence of the timing logic 6 serve to allow the instantaneous d-c signal to alternately charge "on" capacitors 39, 41, 42 and "off" capacitors 40, 42, and 44 in respective synchrony with the "on" and "off" conditions of the ultraviolet beam 7. Referring to integrator unit 33, a subtraction circuit 45 continuously accumulates the difference between the charges carried by the "on" capacitor 39 and "off" capacitor 40. After a predetermined number (e.g., 24) of repetitions, a signal is gated from the subtraction circuit 45 to a line 48 which is applied to downstream data gathering, converting, and storage equipment 52 in which, by conventional means, the signal is prepared for storage (e.g., by analog to digital conversion) and is stored (e.g., on magnetic tape) for later analysis. Similarly, the "on" and "off" capacitors 41, 42 of integrator unit 34 are alternately charged for the same predetermined number of repetitions immediately after which the output signal from the subtraction circuit 46 is coupled through line 49 to data gathering, converting, and storage equipment 52. In a like manner, the "on" capacitor 43 and the "off" capacitor 44 of integrator unit 35 are alternately charged for the same predetermined number of repetitions after which the output of the subtraction circuit 47 is applied to line 50 as another input to data gathering, converting, and storage equipment 52.

It is important to appreciate that the output signals (each of which is only momentarily valid) from the integrator units 33, 34, 35, do not appear simultaneously on lines 48, 49, 50. Rather, under control of the timing logic 6, the output signal on line 49 appears one-third the predetermined number (e.g., 8) of repetitions later than the output signal on line 48, and the output signal on line 58 appears one-third the predetermined number of repetitions after the signal appears on line 49. This overlap eliminates the possibility of missing a target which comes into the field of view during the middle or toward the end of an integration cycle of the predetermined number of repetitions. As will be discussed more fully below, the 500 Hz apparatus and circuitry is configured for the detection of "small" targets, and one such integration cycle takes an amount of time equal to the time lapse while flying over one small target of nominal size at 100 mph. If such a target came into view during the middle of an integration cycle and no provision for overlap were made, its power would be divided between two integration cycles and might be lost.

Similarly, the output from the 700 Hz slot filter 29 is detected by precision rectifier 52 to obtain a negative d-c signal which is applied to integrator units 53 and 54, through respective electronic switches 55, 56, to alternately charge "on" capacitors 57, 58 and "off" capacitors 59, 60 for a predetermined (e.g., 16) number of on/off cycles of the ultraviolet beam 7. After 16 on/off cycles, the subtraction unit 61 within the integrator unit 53 issues an output signal on the line 62 which is applied to the downstream processing equipment 52. In like manner, but offset for one-half the predetermined number (e.g., 8) of on/off cycles employed in the 700 Hz circuitry, the subtraction circuitry 53 places an output signal on line 64 which is representative of the instantaneous cummulative difference of charges carried by "on" capacitor 58 and "off" capacitor 60.

Following the 2100 Hz slot filter 31, a precision rectifier 65 drives integrator units 66, 67 through respective electronic switches 68, 69 to alternately charge "on" capacitors 70, 71 and "off" capacitors 72, 73. After a predetermined number (e.g., 16) of repetitions in each integrator unit 66, 67, but staggered by half the predetermined number of on/off cycles, output signals are issued by subtraction circuits 74 and 75 onto, respectively, lines 76 and 77 for downstream handling.

It will therefore by appreciated that the signals appearing sequentially on lines 48, 49, and 50 represent meaningful information obtained from sensed targets, chopped at 500 Hz, which fluoresce with a significant green component of emitted light. Similarly, the signals appearing separately on lines 62 and 64 and on lines 76 and 77 represent meaningful information obtained from sensed targets, chopped at 700 and 2100 Hz, respectively, which fluoresce with a significant green component of emitted light. The meaningful signals which are applied to the data gathering, converting, and storage equipment 52 are also stripped of a very large percentage of noise and signals which are not desired signals. The theoretical considerations by which this elimination of noise and undesirable signals is achieved will be discussed in detail below.

Corresponding information obtained from any blue light signal component and any red light signal component will be processed in a like manner in respective blue and red processors (not shown in FIG. 1) which will apply 14 input signals (represented by the block 78) to data gathering, converting, and storage equipment 52.

It will be recalled that the light pipe 14 is only one of 18 similar light pipes arrayed with their input optics disposed side by side such that each light pipe receives available photons from one-eighteenth of the swept area below. Each of the 17 additional channels in block 15 develops and applies 21 output signals to the data gathering, converting, and storage equipment 52 such that it will be understood that a total of 378 constantly updated signals characterizing the target area below are gathered by the equipment 52. Position information from conventional navigation equipment 79 is continuously updated and stored in order that the meaningful stored fluorescence information may subsequently be related to a specific aircraft position.

The airborne mineral exploration system of FIG. 1 can be viewed as two functional blocks: the transmitter and the receiver. The output of the transmitter is pulsed ultraviolet light. This transmitted light signal causes pulsed fluorescence, in the visible part of the spectrum, by various minerals that are referred to as targets. The receiver is configured to sense the visible light emitted by the targets and discriminate simultaneously the fluorescent color, target size, target brightness, and relative target position.

In a typical search area during night operations, a totally dark field of view cannot, as a practical matter, be expected. Natural sources of light, such as the moon and stars, as well as manmade sources (car headlights, marker beacons, sky "glow" from a nearby city, etc.) constitute visible noise. The receiver is also adapted to remove this noise, either by filtering or subtraction.

The primary sensing elements of the receiver are photomultiplier tubes such as the PMT 22 shown in FIG. 1. Before any target signal reaches a PMT, however, it has already been sorted by position and color and is being chopped by one of the size discriminator belts 11, 12, 13. Relative position is determined by which of the eighteen light pipes (such as the light pipe 14 of FIG. 1) has captured the target signal. Color information is provided by the optical filters (16, 18, 20 in FIG. 1) in the light pipes. Specific color bands are transmited to specific PMT's such that determining which PMT receives the target signal indicates target color.

The size discriminator belts 11, 12, 13 pulse the light from a target in direct relation to the target's size. A target four inches in diameter or smaller is chopped at 500 Hz. Twelve inch or smaller targets are chopped at 2100 Hz. Thirty-six inch or smaller targets are chopped at 700 Hz. While the smaller targets will be chopped by the larger discriminators, a target is not chopped by all the belts simultaneously but rather is chopped sequentially as the target image moves from one belt to another. Thus, it will be understood that not all of the signal processing is effected in the electronics portion of the receiver.

The system of FIG. 1, then, identifies fluorescing minerals by amplification of visible light signals derived from them and attenuation of noise from all other sources. This forms the basis of the system theory.

Signal amplification is relatively straightforward. Chopping imparts a frequency characteristic to an incoming optical signal. The PMT, after exchanging one electron for one sensed photon, amplifies the electron current about $5 \times 10^{-5}$ times. An audio preamplifier, with its passband set to accept chopped signal frequencies, amplifies the a-c output of the PMT some 900 times.

Attenuation of the noise is a far more complex process which is carried out by two of the system's subsystems, the optical choppers (including subsequent electronic filtering) and the integrators (with timing set by the transmitter shutter and the timing logic), operating in conjunction.

Figure 2:
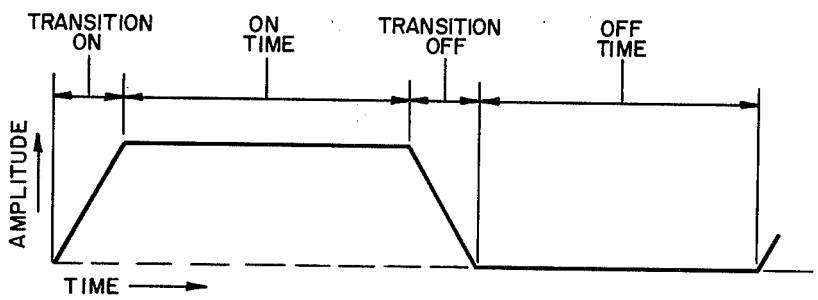
FIG. 2 is a waveform representation illustrating an operational aspect of the active ultraviolet light source employed in the system of FIG. 1.

Referring again to FIG. 1, the transmitter issues a series of pulses of ultraviolet light, each pulse being "on" for approximately 10.1 milliseconds. After this "on" period, there is a transition time (while the shutter 4 is closing) of approximately 2.4 milliseconds, followed by an "off" period of 10.1 milliseconds when the lamp 1 is completely shuttered, and then another transition time of 2.4 milliseconds (while the shutter 4 is opening) followed by another "on" period of 10.1 milliseconds, to begin another full cycle of operation. FIG. 2 illustrates the relative amplitude of the ultraviolet beam 7 versus time for a single cycle of the transmitter shutter 4.

The receiver measures valid information only during the periods when the shutter 4 is completely open or completely closed and therefore has to be synchronized with the shutter. This synchronization of the transmitter and receiver system imparts the first useable information to the received signal; viz.: that valid fluorescent target information can only arrive when the shutter 4 is open. A signal which is received when the shutter 4 is closed constitutes noise, and provision must be made for the elimination of this noise.

It is unfortunate that nearly all the world fluoresces to some extent when stimulated by ultraviolet radiation. To discriminate between a target and the rest of the world when both are fluorescing, the fact that targets are usually smaller and brighter than the rest of the world is meaningful information and permits the use of a plurality of size discriminator chopping belts which each impart a frequency to target-sized objects.

Figure 3:
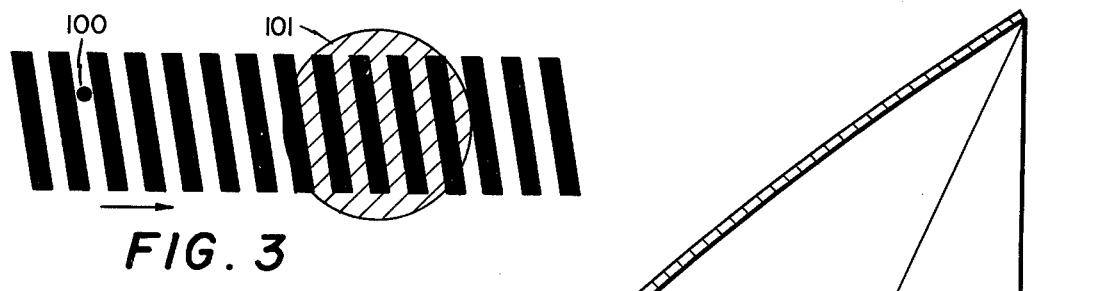
FIG. 3 illustrates the effect of observing relatively large and relatively small targets at the position of one of the chopper belts employed in the system of FIG. 1.

Light, whether from fluorescing targts, fluorescing background, or reflective background, is gathered from the target area by the receiver lens 10 and focused onto the three chopper belts 11, 12, 13. As illustrated in FIG. 3, the light from relatively small objects 100 will be chopped (and thereby given a frequency) while the light from relatively large objects 101 or large areas of fluorescing background will not be chopped. Chopping of light from target-sized objects constitutes another aspect of the information needed to discriminate fluorescent targets from background. In practice, light can only be from a target if it is received only when the lamp is on and is chopped by one of the size-discriminator chopper belts. Conversely, light that is only received while the lamp is off and/or has no frequency imparted by a size-discriminator chopper cannot come from a target. These are two important pieces of information that are analyzed by the electronics in the receiver. Target position and color, however, are determined before the light from a target ever is detected electronically.

An array of light pipes (such as the light pipe 14) succeed the chopper belts 11, 12, 13 in the path followed by light from the target area. Each of these light pipes will gather light from a specific plot in the target area, and, as previously noted, by determining which light pipe a signal has passed through, it is possible to determine the target position. The light pipes themselves are fabricated to incorporate reflective interference filters (e.g., 16, 18, 20 in FIG. 1) so that light components of different colors emerge from different parts of the pipes. Therefore, light entering a PMT (the primary sensing element of the receiver) has already been sorted by position and color.

Consider briefly, by way of example, the detection by the system of FIG. 1 of a 12 inch square (144 square inches), or the equivalent, target of autunite.

The output of the mercury vapor lamp 1, after being conditioned by the filter 3 to remove visible light, is mechanically chopped by the shutter 4, to give a near squarewave frequency of 40 Hz. This ultraviolet light stimulates a target on the ground (2000 feet away), causing it to fluoresce.

The fluorescent light, itself having a repetition rate of 40 Hz in synchrony with the transmitted ultraviolet light, passes through the lens 10 and is focused on the chopper belt 12 which has a line width of 0.009 inches. The chopper belt 12 imparts a frequency of 2100 Hz to the incoming signal. Ambient light enters the receiver system with signal light; for the most part, however, it is not chopped.

Next, the light enters the light pipe 14 which is assumed for the example to represent the target's ground position. Autunite gives off light at wavelengths of 4875 angstroms, 5100 angstroms, and 5333 angstroms when stimulated by ultraviolet light. Therefore, the signal light is reflected off the first filter 16 (which passes only wavelengths between 3900 angstroms and 4700 angstroms), is redirected by the prisms of the light pipe 14 onto the second filter 18 (which has a passband of 4700 angstroms to 5500 angstroms), through which it is permitted to pass. Another prism funnels the light onto the face of the photomultiplier tube 22.

Each photon sensed by the PMT 22 causes a cascading of electrons in the tube. The current that results from the flow of these electrons is amplified by the low-noise audio preamplifier 24, and the preamplifier output signal passes through the electronic slot filter 31 (an active, high-Q narrow passband filter). This filter allows only pulses of 2100 Hz±2% to pass.

The current from the slot filter charges "on" capacitor 70, 71 in the integrator units 66, 67. The charge on these capacitors represents signal and noise during one 1/80 second "lamp on" cycle, the actual sampling lasting 1/120 second intermediate the 1/80 second "frame".

In the next 1/80 second, the entire process is repeated. This time, however, the ultraviolet source is "off", so no valid signal enters the system, only noise, both external and internal. The noise current charges capacitors 72, 73 in the integrator units 66, 67. This charge represents the noise for one 1/80 second "lamp off" cycle during a 1/120 second sample period.

For the 2100 Hz section of the system, this "lamp on-lamp off" cycle is repeated, until a total of 12 "lamp ons" and 12 lamp offs" have been stored on the capacitors of each of the integrators 66, 67. The charges on the capacitors 72, 73 are subtracted, respectively, from the charges on the capacitors 70, 71, and any charge remaining is signal and some small amount of unattenable noise. The outputs from the integrators 66 and 67, staggered in time as previously noted, are then transferred through lines 76 and 77, respectively, to data gathering, converting, and storage equipment 52 wherein the signals are collected, digitized, and magnetically recorded by conventional means for subsequent analysis.

Because of the size of the exemplary autunite target, it will also be chopped by the more coarse (0.027 inch line width) belt 11 which imparts a frequency of 700 Hz to the incoming signal. Therefore, an electrical signal will also pass through the slot filter 29 to the integrator pair 53, 54 in a manner exactly analogous to that described immediately above for the 2100 Hz signal applied to the integrator pairs 56, 57. Therefore, signal information will be present on the lines 62, 64 to the data gathering, converting, and storage equipment 52 to provide additional size information about the target. However, the target would be too large to be chopped by the fine belt 13 such that no significant 500 Hz information will pass through the slot filter 27 resulting in essentially no output from the integrators 33, 34, 35 on the lines 48, 49, and 50, which information will also be stored on the data gathering, converting, and storage equipment as a further indication of the size range of the target.

Certain detailed configuration and construction of the essential components as employed in the present preferred embodiment of the invention will now be discussed.

Figure 4:
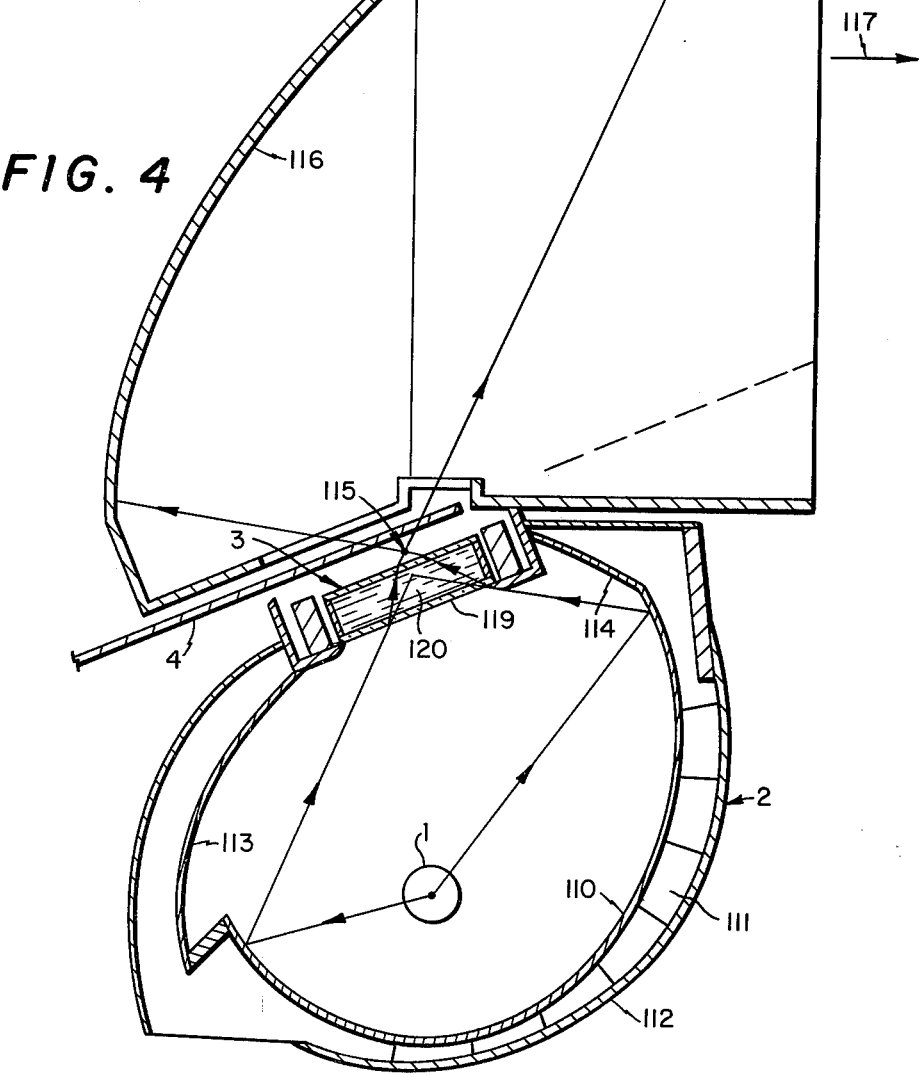
FIG. 4 is a cross-sectional representation illustrating certain important aspects of the ultraviolet light source employed in the system of FIG. 1.

In order to achieve a fan-like radiation pattern below the aircraft without resorting to the necessity, and consequent mechanical complexity, of employing a rapidly scanning subsystem, the transmitting apparatus illustrated in FIG. 4 is used to achieve an illumination pattern beneath the aircraft approximately 2,000 feet wide by 167 feet long (in the directionn of the aircraft travel) from a nominal operation altitude of 2,000 feet above the terrain. The lamp 1 is a high power mercury vapor type 6 inches long and rated at 3,600 watts. The techniques and equipment for striking and maintaining the arc in such a lamp are well known to those skilled in the art and are not discussed here. The lamp 1 is situated at the first focus of an elliptical surface 10 in a first region of the reflector 2. Since the lamp 1 radiates a great deal of heat, a water jacket 111 is provided between the elliptical inner surface 110 and an outer wall 112 of the first region of the reflector 2. In operation, water is circulated through the water jacket 111 and is cooled in a radiator (not shown). The light issuing from the lamp 1 is reflected from the elliptical surface 110 (and from spherical surfaces 113 and 114 which redirect the light back to the elliptical surface 110) through the filter cell 3 to a focus 115 shared by the elliptical surface 110 and a parabolic surface from which it is directed downwardly in the direction of the arrow 117 to the target surface below the aircraft.

As previously noted, the function of the filter cell 3 is to allow only ultraviolet light to pass into the illuminated target area. While conventional glass filters are available having suitable optical characteristics, it is preferred to use a fluid filter because of the solid filter's tendency to "solarize" and also because, again, of the very large quantities of heat which must be dissipated. It is therefore preferable to use a fluid filter consisting of plates 118 and 119 separated by a cavity 120 through which the filter fluid may be circulated. A fluid which achieves the desired transmissivity characteristics may be prepared by dissolving 330 grams of cobalt sulfate and 420 grams of nickel sulfate into distillated water for each liter of filter fluid desired. This fluid is also continuously circulated through an external radiator system (not shown) to carry off the substantial quantities of heat absorbed by it in the process of absorbing the undesired components of the light emitted by the lamp 1. It may be found, during use, that the amount of ultraviolet light which passes through the filter cell becomes very much decreased. It has been found that this condition can be corrected, if encountered, by restoring the pH of the fluid through the addition of sulphuric acid in a carefully controlled manner. The shutter 4 is advantageously situated, as shown in FIG. 4, between the filter cell 3 and the entrance to the parabolic surface 116 section of the reflector 2. In this position, the size of the shutter 4, and hence the mechanical and inertia problems associated with its rotation, are minimized.

Referring again to FIG. 1, the lens 10 used to gather light from the target area and focus this gathered light on the chopper belts 11, 12, 13 may be an 8 inch diameter, 20 inch focal length 1/f=2. The lens resolution should exceed 0.001 inch in the focal plane (10 seconds of arc) in order to resolve the 0.003 inch, 0.009 inch, and 0.027 inch target images. The lens may be disposed in a cylindrical housing preferably having means for raising and lowering the lens to facilitate focusing the image on the chopper belt. Experience has shown that employment of a slightly larger (10 inch diameter) achieves slightly improved performance, particularly with the outermost light pipes.

The chopper belts 11, 12, 13, running in the focal planes of the lens 10, may be loops of film on which lines have been exposed. The distance between lines is the same as the width of the lines on each respective belt (i.e., the alternating opaque/clear belt portions have the same width). For the coarse grain belt 11, line widths are 0.027 inches; for the medium grain belt 12, line widths are 0.009 inches, and for the fine grain belt 13, line widths are 0.003 inches. Belts 11 and 12 are each 11 millimeters wide and are carried on the same loop of film. This loop, when driven at 37.8 inches per second, gives frequencies of 700 Hz and 2100 Hz, respectively. Belt 13 is 16 millimeters wide and is driven at a linear velocity of 3 inches per second to provide a resultant frequency of 500 Hz. The two belt loops are typically driven from synchronous motors by way of brass pulleys over brass idlers and are independently adjustable as to belt tension and alignment on the pulleys and idlers. The loop including the belts 11 and 12 is carried on a brass pulley (not shown) of 3.637 inch diameter turned by a synchronous motor (not shown) at 200 rpm. The speed of 3 inches per second is given to the belt 13 by using a 2.000 inch diameter brass pulley (not shown) driven by a synchronous motor (not shown) at 28.8 rpm.

Great care must be taken in the preparation of the master belt from which chopper belt prints are made for use in operation of the system. In particular, splices must not contain sudden changes in line width, which changes, if present, will cause a pseudo-signal that varies with total incident light energy. This pseudo-signal is difficult to distinguish from a valid signal as its periodicity would depend upon a beat frequency of splices and the chopper wheel. The end splice, that connects the ends of a print to form a loop, is less important than master splices since its probability of being at any one place at any one time is significantly less. Nonetheless, this splice has been observed to cause an instantaneous shift in phase when not carefully carried out.

A typical light pipe from the array is illustrated in side view in FIG. 5 and in end view in FIG. 6. Each light pipe performs two functions: (1) divides the received light into three color bands; and (2) sends each band's light to the proper PMT. The function of the components is the same for each of the eighteen pipes. As shown in both FIGS. 5 and 6, a first straightening prism 121 of the light pipe directs light from the lens 10 into the light pipe. Thus, it will be understood that the straightening prism 121 for each light pipe in the array will vary in angulation as necessary to straighten the light from the lens for introduction into the first conduit section 122 of the individual light pipe. The light passes upwardly through the first conduit section 122 and is reflected by a first triangle section 123 into a second, horizontal conduit section 124. At the opposite end of the second conduit section 124, the light encounters a first (blue) interference filter 125 positioned at a slight angle from the vertical by insert 126. Any light component of wave length between 3900 angstroms and 4700 angstroms will pass through the blue filter 125, or reflected by second triangle section 127, and then be funneled through blue conduit 128 to the blue PMT associated with this particular light pipe. All other light is reflected at a slight upward angle by the blue interference filter 125 and is totally internally reflected in prism 129 onto green interference filter 130 which is maintained at a slight angle from the vertical by insert 131. Light components in the band from 4700 angstroms to 5550 angstroms passes through the green filter 130 and is reflected by a third triangle section 132 into green conduit 133 which funnels this component of the light onto the green PMT for this particular light pipe. Light that is not passed by the green filter is reflected thereby through prisms 134 and 135 onto the red filter 136. All red light (5550 angstroms to 6500 angstroms) is passed by this red filter 136 and is reflected by the fourth triangle section 137 into red conduit 138 to the red PMT for this particular light pipe. The remaining light that does not pass thru the red filter is absorbed by it. The indicies of refraction of the components labeled A in FIG. 5 are 1.58 while the indicies of refraction for those components labeled B are 1.717. The indicies of refraction of the interfaces are: between the second conduit section 124 and the prism 129, 1.56; between the prism 129 and the prism 134, 1.49; and between the prism 134 and the prism 135, 1.56.

The photomultiplier tubes (such as the PMT 24 of FIG. 1) are high gain/low noise amplifiers. Generally, a PMT consists of a photocathode, several gain stages called dynodes, and an anode, all sealed in an evacuated tube. Photons which strike the photocathode cause it to emit electrons. These electrons are attracted (by an electric charge) to the first dynode. When an electron strikes the first dynode, it causes several other electrons to be knocked off. The knocked off electrons are then accelerated towards the second dynode, where each one causes several more electrons to be knocked off which are accelerated towards the next dynode, etc.

An exemplary PMT which has been used in the system is an RCA 4518. Referring to FIG. 7, this PMT has a photocathode 151 and ten dynode stages 150. It achieves a gain of about 500,000, meaning that for every photon causing emission of an electron from the photocathode, some 500,000 electrons will be knocked off from the last dynode in the PMT. These electrons are collected at the tube anode 152 and constitutes a current output in response to a photon input. This output current is developed across the anode return resistor 23, causing a negative-going voltage spike to appear across the resistor as an output signal which means that the PMT has "seen" a photon. If there are many photons striking the photocathode, then there will be many spikes. If photons arrive so fast that one spike cannot return to anode potential before the next spike arrives, then a shift in the d-c voltage level of the anode will be present as a signal component.

The photoemission/secondary emission principles combine to make the PMT a high-gain detector/amplifier that is almost noise free. There is one major source of noise, however, that bears consideration: dark noise. Both the photocathode and the dynodes are made from materials that readily release electrons from their surfaces. Occasionally, they will release an electron for no apparent reason. When there is a release, the emitted electron travels through the amplifier section just as if it had come from a photon. Then there is a voltage spike produced at the anode 152 that behaves just like a spike produced by photon amplification. This noise must be eliminated or compensated for or there will be a false indication of target. The randomness of this noise makes complete elimination impossible, but, as will be discussed below, compensation can be statistically near perfect, especially when long time intervals are allowed.

The photocathode 151 of the tube is held at ground potential, and the anode is connected to a stable positive 1500 volt d-c supply. Supply stability is very important to maintain a steady tube gain. The PMT must also be shielded against electrostatic and magnetic fields. The output voltage spike generated by a single photon is generally on the order of five or six millivolts, negative-going from the 1500 volt d-c reference, and has a duration of about forty microseconds.

In summary, a photon striking the PMT photocathode is converted to a single electron which is amplified in the PMT to create a sizeable current which causes a voltage spike to appear at the output of the PMT. This spike is coupled through capacitor 153 (for isolation from the +1500 volts and any d-c shift) to the preamplifier 24. The manner in which the various electrodes of a PMT are biased is best obtained from the tube manufacturer. For the RCA 4518 employed in the present application, a straightforward bleeder string 154 using the maximum size resistors recommended by RCA has resulted in satisfactory performance.

The advantages of using a PMT over other light sensitive devices are: (1) high gain, (2) narrow band of sensitivity, (3) high quantum efficiency, (4) low noise, and (5) stable operation over a wide temperature range. Disadvantages include the tube's requirement for a high voltage supply (+1500 volts d-c) that must be highly stable, and the fact that tubes are not solid-state devices and are therefore subject to damage from shock and vibration. Also, PMT's exhibit a phenomenon called "blindness" after exposure to high level of incident light. The photocathode of the 4518 tube is extremely sensitive to most visible light and is easily blinded, even in semi-darkness. Once blinded, the photocathode emits electrons at a very high rate for thirty minutes to an hour after exposure, making the tube useless for sensing purposes. If exposed to light from a fluorescent bulb, the blindness may continue for up to forty-eight hours after exposure. For this reason, the tubes are always shielded from light when not in use.

There are five critical factors of environment which effect photomultiplier tube performance. In arbitrary order they are: (1) electromagnetic and electrostatic fields, (2) surface moisture in the high voltage areas around the tube base, (3) ambient light, (4) vibration and shock, and (5) ambient temperature. All of these factors must be controlled or limited in some manner in order to assume proper tube function.

Electromagnetic radiation which passes through the PMT can cause fluctuations in the focusing characteristics of the tube and thus change in tube gain. Proper shielding requires a cylinder made of highly permeable material which encloses the PMT. Cylinders of this type (made from specially annealed mu-metal) are available from several suppliers that deal exclusively with PMT shielding, as well as from PMT suppliers themselves. A good electrostatic shield is provided by an electrical connection to the cylinder and maintaining its potential equal to that of the PMT's photocathode.

Surface moisture is a relatively significant problem. Even though all the materials used in the tube base, socket, and biasing network should be hydrophobic, any dirt, dust, or similar contamination of their surfaces can lead to the creation of a thin water film that becomes a conductive path. In that event, the combination of high voltages and high impedances in the area of the tube base builds a large space-charge that periodically arcs or discharges through the water film. These discharges resemble photon-created pulses and therefore constitute a source of noise in the PMT. Keeping all the surfaces completely clean has proved nearly impossible in the past, and for this reason, it is desirable to dehumidify the air around all critical areas by circulating air in a closed system over the PMT base and biasing network and through a dessicant. In this way, surface moisture is reduced to a minimum and has negligible effect.

It is obvious that a PMT sufficiently sensitive to detect a single photon should be well shielded from all sources of light except the target, and the possibility of encountering tube "blindness", wherein the photocathode becomes saturated has been noted above. Ordinary room lighting levels are far beyond the saturation level of the RCA 4518 tube. The tube should only be exposed to very low levels of light or light with a wavelength longer than 6000 angstroms (far red). Saturation does not permanently damage the photocathode, but the tube needs a recovery time before it can be trusted to give an accurate response, and, again, if the tube is exposed to fluorescent lighting or direct sunlight the recovery time is in the range of twenty-four to forty-eight hours.

The PMT is relatively immune to shocks and vibrations, but it is inherently a somewhat fragile device and should be handled as carefully as possible. It is also fairly temperature stable (operation is specified by RCA as between $-100°$ C. to $+85°$ C.) with respect to tube gain. Dark current increases with temperature, however, such that the tube should be kept as cool as practical. Direct tube cooling is not usually required for the type photocathode used in the 4518 since dark current is not appreciably reduced by lowering the temperature below 25° C.

The preamplifier 24 has a gain of about 1000 to translate the five or six millivolt input signals into five or six volt output signals. The preamplifier uses a National Semiconductor LM 381 AN integrated circuit and is designed directly from a National Semiconductor handbook for ultra-low noise amplification of low level signals. To the amplified signal of, say, five volts, it adds a noise component of about five millivolts.

Photons that arrive from a target will not appear in a completely random order. The target will have a finite size and therefore will be chopped by one or more of the size discriminator belts 11, 12, 13. There will therefore be a frequency associated with the arrival of target photons that will mark them as independent or random photons resulting from reflected moonlight, car headlights, etc. The preamplifier 24 is biased and configured to amplify a narrow band of frequencies that just encompasses the size-discriminator chopping frequencies; i.e., a nominal band pass of from 460 Hz to 2140 Hz. Thus light from large, unchoppable sources producing d-c level shifts at the PMT output will not be amplified by the preamplifier. Similarly, small sources (security lights, marker beacons, etc.) which can be chopped will have a beat frequency (60 Hz line beating with size discriminator frequency) that will minimize the extent to which their signals will be amplified (although small sources still may be amplified somewhat).

For an extremely small target (e.g., two inches on a side), the photon arrival rate is calculated to be about between one thousand and two thousand per second. Half of these photons will be blocked by the chopper belts, leaving a minimum of on the order of five hundred photons per second. While this is a 500 Hz frequency, it is not at all sinusoidal because there is no signal at all except for about two percent of the time (based on a spike duration of 40 microsecond). The preamplifier 24 tends to treat such pulses as noise, and these signals are amplified just as if they were noise mimicking a frequency within the preamplifier's passband. This results in other problems related to the PMT dark noise problem. The dark noise from the PMT is random, however, and will be dealt with later on in processing, at the integrators.

As previously mentioned, the preamplifier 24 has been adapted from a circuit design in the *National Semiconductor Linear Applications Handbook I*. The preamplifier employs one-half of an LM381AN dual low-noise preamplifier integrated circuit. The notable parameters for preparing a preamplifier for this application are: bandpass between 460 Hz and 2140 Hz (3dB points) and d-c quiescent level adjustable between 1 and 14 volts with a supply voltage of +15 volts.

The equations for determining upper and lower cut-off frequencies (found in the Applications Handbook) give only close approximations to actual measured values. For this reason, each preamplifier should be carefully tested for passband data before use in the system. The circuit may be assembled on a printed circuit which should be mounted as close as possible to the PMT socket. Shielding from electromagnetic noise is essential; for the sake of simplicity the preamplifier is therefore preferably mounted in the same shielded enclosure as the PMT socket.

As shown in FIG. 8, the attenuator network 28 divides the signal into three branches, independent of frequency, to avoid loading the output of the preamplifier 24 or introducing cross-talk feedback from the three slot filters 27, 29, 31 into the signal flow-paths. The network consists of three adjustable L-pads comprising adjustable resistors 175, 176, and 177, respective fixed resistors 178, 179, and 180, and d-c isolation capacitors 181, 182, and 183. The pads are adjustable to keep the signals into the slot filters small enough to avoid filter saturation, but otherwise to achieve the maximum possible equal gain through the filters.

This adjustment may be carried out with the arrangement illustrated in FIG. 9. Each L-pad/filter combination is adjusted separately, but the method for each adjustment is the same. A sine wave signal (from a signal generator 184) matching the selected slot filter frequency is applied to the preamplifier input through the capacitor 153 (FIG. 7). It is not necessary to disconnect the PMT from the circuit, but there should be no power supplied to the PMT. The preamplifier output is monitored on an oscilliscope 185 while the signal generator output level is adjusted until the preamplifier output just begins to clip. Then the slot filter 29 (for 700 Hz) output is adjusted by its associated L-pad potentiometer 179 until its output almost clips. The output level from the signal generator 184 should be such that potentiometer 179 is near the maximum value of its resistance range and should not be changed. The input and output signal amplitudes of the slot filter are then recorded for comparison with similar results obtained with the outer two L-pad/filter combinations (500 and 2100 Hz). Thus, this adjustment is made for all three L-pad/slot filter combinations, recording input and output data for each combination. Then if there are any inconsistencies in signal amplitudes between slot filters, the two higher signals are readjusted to match the response of the smallest signal. It is important to maintain equal response at this point in the signal chain; i.e., just before detection and integration. For a complete system having fifty-four PMT's, adjustment of all signals to match the response of the smallest signal is required.

The targets must be sorted as to size before further processing. Each size range has been given a specific frequency by the chopper belts, and the electronic slot filters (e.g., 27, 29, 31 of FIG. 1) function to sort out this size/frequency information so that the correct signals go to each of the several integrator units.

Active filters are used for the slot filters because of their high Q ratios (center frequency divided by bandwidth), ease of tuning, small size, and temperature stability. The high Q's are needed not only to separate the three different frequencies, but also to aid in further noise reduction.

A preferred slot filter configuration is illustrated in FIG. 10. This circuit is a conventional universal biquad bandpass filter adapted from a design given in *Rapid Practical Designs of Active Filters*, by David E. Johnson and John L. Hilburn. Polystyrene capacitors and metal film or cermet resistors should be used for constructing the filters to achieve the necessary stability. The gain and Q adjustments each have a very narrow span and make practically no difference (other than that intended) in filter operation; however, these adjustments should not be altered after the center frequency ($f_o$) has been set.

FIG. 11 illustrates an arrangement for tuning the slot filter center frequencies. A signal source 186 (preferably from one of the chopper belts 11, 12, 13) of correct frequency is fed into the slot filter (e.g., 29) under test and also into one channel of a two channel oscilloscope 187 equipped with an X-Y trigger mode. The output from the slot filter is applied to the other channel of the scope such that a lissajous pattern appears on the screen. If the filter is not tuned to within four or five Hz of the source frequency, it will have almost no gain; and a straight vertical or horizontal line will appear on the scope. Turning the $f_o$ adjustment potentiometer 188 results in the appearance of characteristic lissajous patterns as the filter approaches resonance; a line sloping downward from left to right represents a 180° phase shift, a circle represents a 90° shift, and a line sloping upwards from left to right represents zero phase shift. A universal filter of the type employed is tuned to peak response when it exhibits zero phase shift between its input and output signals. When this condition is met, the filter also has maximum gain. It may be noted that one of the advantages of this filter type is the ease with which it can be tuned.

The filter design has a nominal design Q of 50 and a nominal gain of about 10. These parameters, as noted before, have very little adjustment. The amount of adjustment could be increased, however, by increasing the value of the potentiometer that is used for the respective adjustments and decreasing the value of the series resistance associated with each potentiometer. It is advisable if making this change to use multi-turn potentiometers, so that fine tuning can be accomplished.

The filters require well-regulated positive and negative power supplies and a very stable reference ground. They should be mounted in a shielding enclosure and employ shielded inputs and outputs. Preferably, the three filters required for the operation of one PMT are mounted on separate PC cards, along with their respective L-pad attenuators in the receiver electronics cabinet. High quality audio style coaxial cable may be used for external connections.

Since the signal information is applied to the slot filters in 1/40th second bursts and ceases immediately at the end of each burst period, the high Q filters tend to "ring"; i.e., tend to continue issuing a damped output signal when there should be no signal output. This characteristic is overcome by the use of analog switches 189, 190 disposed, respectively, across the operational amplifiers 191 and 192. Immediately after the signal burst period ends, the analog switches 189, 190 are momentarily rendered conductive to short out the amplifier feedback circuits, thereby briefly dropping the circuit Q to a very low value which results in elimination of the ringing effect.

The system must detect the heretofore a-c target signal and prepare it for use by the integrators. A simple diode rectifier could be used for detection except for the unacceptable signal loss at the diode junction. To avoid loss of signal, a precision rectifier circuit is preferred to carry out the detection represented by the diodes 51, 52, 65 in FIG. 1. Thus, as shown in FIG. 12, the precision rectifier inverts the part of the target signal that is below ground reference into a positive voltage of equal magnitude. The positive target signal component is passed through unchanged except for buffering by an output amplifier to provide isolation between the preceding slot filter output and the succeeding integrator unit input.

More particularly, for negative signal components, the output of amplifier 200 is clamped to the forward drop across the diode 201 (on the order of 0.7 V) and is isolated from the summing point of amplifier 202 by the high reverse impedence of the diode 203. The amplifier 202 then functions as a simple unity-gain inverter with input resistor 204 and feedback resistor 205 to obtain a positive going output.

For positive signal components, the amplifier 200 operates as a normal amplifier with its output connected to the summing point of amplifier 202 through resistor 206. Amplifier 200 then behaves as a simple unity-gain inverter with input resistor 207 and feedback resistor 208. The gain accuracy of amplifier 200 is not affected by the diode 203 since it is inside the feedback loop. Positive current enters the summing point of amplifier 202 through resistor 204, and negative current is drawn from the same running point through resistor 206. Since the voltages across the resistors 204 and 206 should be equal and opposite, the resistance value of resistor 206 is one-half the value of resistor 204 such that the net input current at the summing point of amplifier 202 through 206 is equal to and opposite from the current through resistor 204, and the amplifier 204 operates as a unity-gain inverter, again giving a positive input. This precision rectifier is adapted from a similar design in *National Semiconductor Linear Applications Handbook I* (1973), Application Note AN-20.

The final phase of signal processing occurs in integrators such as the integrator units 33, 34, 35, 53, 54, 66, 67 shown in FIG. 1. It is in the integrators that the random noise remaining with the target signal is subtracted, leaving only the target signal.

Integration requires eighteen cycles for the 500 Hz signal and twelve cycles for the 700 Hz and 2100 Hz signals, each cycle being composed to two steps. As shown in FIG. 13, each integrator unit consists of two matched op-amps 210, 211 configured to integrate, an inverter 212, a summation amplifier 213, and analog control switches 214, 215, 216, 217. The integration process is controlled by the timing logic (discussed further below) with the use of the control switches. The timing is keyed to the on/off pulses of the ultraviolet light issued by the transmitter.

At the beginning of integration, the two op-amps 210, 211 have just previously been set to zero by momentarily closing the switches 214, 215. At the start of the next cycle of the transmitter (lamp "on"), the first op-amp 210 is switched into the circuit by analog switch 216 to receiver the d-c signal from the detector/rectifier. The integrating capacitor 218 stores a charge proportional to the total power received by this op-amp when the lamp is "on". When the lamp goes "off", the first op-amp is switched out of the circuit by opening the switch 216, and the second op-amp 211 is switched in by closing the switch 217. The second integrator capacitor 219 stores a charge proportional to the total power received when the lamp is "off". The voltage representing this charge is fed into the inverter 212 to obtain a voltage signal having a polarity opposite the charge on the first capacitor 218. Then these two signals, the power from when the lamp was "on" and the power from when the lamp was "off", are fed into the summation amplifier 213. The output from the summation amplifier 213 represents the difference between background noise and target signal response plus background noise. The process is repeated eighteen times for the 500 Hz signal and twelve times for the 700 and 2100 Hz signals, each time adding signals to the alternate integrations of the op-amps until the end of an integration period. At the end of each integration period, the output from a given summation amplifier may be sampled as valid data; then the op-amps are reset, and another integration period commences.

Associated with each PMT such as the PMT 22 of FIG. 1, are seven sets of integrators divided among the three separate frequencies of the size-discriminator belts 11, 12, 13. Three integrator units 33, 34, 35 monitor the 500 Hz signals while the 700 Hz and 2100 Hz signals are each monitored by only two integrator units, 53, 54, and 66, 67, respectively. The reason for this unequal distribution is the size of target assigned to each frequency band. The target chopped at 500 Hz has only one-ninth the surface area of the next larger size under optimum conditions. Smaller surface area results in lower fluorescence output; consequently, in order to sense a useable number of photons, the system must "look" for a longer time at the smaller target.

Taking a longer look at a target means increasing the number of lamp cycles in each integration. At 500 Hz the system looks for eighteen lamp cycles instead of the twelve needed for the two other frequencies. To avoid missing target signals at the integrator reset time, the integration periods overlap each other by six lamp cycles. Maintaining an overlap of six cycles requires three integrators. When there are only twelve lamp cycles in an integration period, only two integrators are required to obtain the overlap.

The integrator units are the final step in signal processing in the airborne system. Their outputs are ready for the data acquisition system 52 (FIG. 1) and subsequent recording, compilation, and processing. The acquisition system is influenced by the timing of the integrator units, however, especially since the integrator output is valid for only a few milliseconds.

Preferably, the integrator units are each built from one quad J-FET operational amplifier chip. The switches are preferably CMOS bilateral switches. The signal from the detector is introduced on the wiper arm of a potentiometer 220. This potentiometer is a balance adjustment to null the output when the input is constant.

FIG. 14 illustrates a test set-up for balancing the integrators. This balancing is crucial for enabling the integrators to cancel noise inputs as well as inhibiting the integrators themselves from producing an erroneous output. The timing logic 221 is employed to switch the input switches at a 40 Hz rate as well as reset the integrators. A d-c signal (from any convenient source 222) of about one volt magnitude is applied to an integrator unit 223 under test. The output of the integrator is monitored on an oscilliscope 224. With a constant input to the op-amp integrators, the output from the summation amplifier in the unit under test should remain at ground potential. (It may leave ground and then return at a 40 Hz rate, but the output just before reset time should be zero volts.) If an error exists, the input potentiometer 220 is adjusted to cancel the error.

Next, some small amount of signal, pulsed above ground at a 40 Hz rate, is fed into the integrator input. Now a ramp should appear at the summation amplifier output. Depending upon the phase relationship between the input signal and the switching signal, the ramp will slope up or down. The presence of a ramp signal that nulls after reset is all that is required to show proper operation of the assembly.

All components used in the integrator units should be precision and stable. The two integrator capacitors 218, 219 are especially critical, and to avoid balancing problems these should be closely matched for equal capacitance. Resistors should be either metal film or cermet precision, and the input potentiometer should be a cermet multi-turn type. The integrator assembly requires well filtered positive and negative supplies as well as a steady analog ground.

Although the CMOS switches 214, 215, 216, 217, are obtainable in a quad package, the circuit design requires separate devices for the reset switches 214, 215 and the integrator alternating switches 216, 217. The switches that alternate the integrators require a $V_{DD}$ of +15 volts and a ground $V_{SS}$. The reset switches require a grounded $V_{DD}$ and a $V_{SS}$ of −15 volts. These supply differences relate directly to the polarity of the signals being switched and the switch resistance when closed. Reset switches can use the same package and indeed one package of four switches can be used for two integrator assemblies if needed. In a like manner, the alternating switches can have a common package shared by two integrator assemblies. But a reset switch and an alternating switch cannot occupy the same package.

The integrators have to be coordinated within at least two time frames. First and foremost, the op-amp integrator pairs in each integrator unit must be switched so that one of the pair integrates during the 1/120th second sample period when the lamp is "on" and the other integrates during an equal sample period when the lamp is "off", the integration time periods being very closely matched. Of secondary importance is the timing between integrator sets producing the overlap of integration periods.

All of the timing is keyed to the lamp shutter 4 as shown in FIG. 1. The circumferential position of the shutter is sensed by an optical sensor 5 that changes its output when the shutter becomes fully open (lamp "on") or goes fully closed (lamp 37 off"). The sensor therefore creates a CMOS compatible pulse train as the shutter disk rotates. This pulse train is used as the system clock for the timing logic 66. Since the shutter disk itself initiates the timing pulses, absolute stability of shutter frequency is not required as long as the integration "on" and "off" times are the same length and are synchronized to the transmitted beam 7.

To maintain exact equality of the "on" and "off" cycles, the original pulse train is used only to trigger the operation of a CMOS counter circuit. This circuit counts a predetermined number of pulses from a crystal clock oscillator to determine a single on or off time. The crystal clock oscillates at 375 kHz, and the counter is accurate to plus or minus one count. For a time period of 8.33 milliseconds, the predetermined count will be 3124 plus or minus one count, or a possible error of approximately plus or minus five-tenths of one percent.

Thus, the signal produced by the shutter disk/sensor combination has a frequency of 40 Hz (period of 25 milliseconds). Noise reduction requires an integrator "on" or "off" time of 8.33 milliseconds. An integration cycle (one "on" and one "off" period) takes 16.66 milliseconds. Subtracting 16.66 milliseconds from 25 leaves 8.34 milliseconds, some of which is used up as shutter transition time. It will be noted that the time remaining after subtracting transition time constitutes lamp energy that is totally wasted. One way to avoid wasting this time is to turn the chopper disk at a rate yielding lamp "on/off" times more nearly equal to 8.33 milliseconds; i.e., somewhat faster than 40 Hz, but less than 60 Hz.

The timing logic block 6 (FIG. 1) has three major functions: (1) provide "on" and "off" signals in synchrony with the transmitter "on" and "off" outputs, (2) render these "on" and "off" signals of equal length, and (3) provide an output to synchronize the integrator circuitry to the transmitter "on" and "off" periods. Performing these functions requires a sensor to determine the position of the shutter disk, a precision clock device with which to measure equal time increments, and some signal-directing or "gating" electronics.

Figure 15:
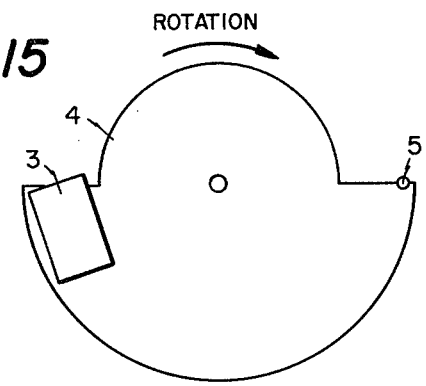
FIG. 15 is a plan view of a shutter disc employed in conjunction with the ultraviolet light source of the system of FIG. 1 and particularly showing the relationship of a position sensor with respect to a filter cell and the shutter disc.

FIG. 15 shows the relative positions of the ultraviolet lamp filter 3 and the timing sensor 5 with respect to the shutter disk 4. The sensor consists of a light emitting diode pointing towards a photo-transistor which is about a quarter of an inch away. This assembly, which is a readily available standard component, is encapsulated in plastic leaving a slot between the diode and transistor pair through which the outer edge of the larger diameter portion of the shutter disk 4 can pass. When the disk blocks the light path between the diode and the transistor, the sensor output is high or a logic "1". When the disk leaves the slot the sensor output goes low to a logic "0".

The relatively positions of the filter 3 and the sensor 5 are important for developing the proper timing synchrony. Note that in FIG. 15 the sensor output will change states (from high to low) just as the filter is completely covered by the shutter 4. As the shutter rotates a further 180° from its position in FIG. 15, the sensor output changes state again (from low to high) just as the filter is completely uncovered by the shutter. These state transitions are employed to trigger the timing logic.

Figure 16:
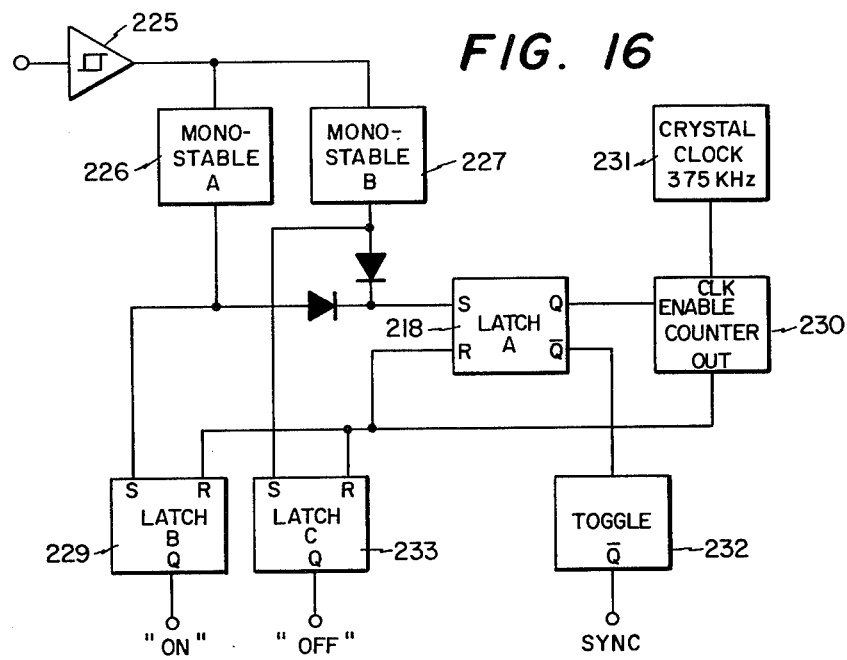
FIG. 16 is a block diagram of certain timing logic employed in the system illustrated in FIG. 1.

FIG. 16 is a simplified block diagram of the timing logic 6 of FIG. 1. The output from the shutter disk sensor is buffered and shaped by a Schmitt trigger, and applied to two monostables 226, 227. The first monostable, 226, is configured to trigger on the positive going (lamp "on") transition of the sensor pulse train. Its output is a 200 microsecond pulse that sets latches 228 and 229, thereby causing the Q outputs of both latches to go high. The Q output from monostable 228 enables the counter 230 which starts counting pulses from the 375 kHz crystal clock 331. The Q output from monostable 229 closes the "lamp on" switches (e.g., 216 in FIG. 13) so that the "lamp on" op-amp integrators (e.g., 210) start integrating the "lamp on" signal. At the end of the predetermined count (equivalent to 8.33 milliseconds), the counter 230 issues a pulse to latches 228 and 229 to reset them, making their Q outputs go low. The "lamp on" switches are opened, the "lamp on" op-amps stop integrating, and the clock is made ready to start the next count. When the Q output of latch 228 goes low, the Q̄ output goes high. This low to high transition is applied to a toggle circuit 232 and causes the toggle to change state. The toggle changes state after every clock reset pulse and thus becomes, as will be further explained, a synchronized pulse train that has the same frequency as the lamp shutter disk output with transitions at the end of every lamp "on" and lamp "off" period.

Now, the shutter disk 4 transitions towards interrupting the sensor 5. At the instant the shutter closes over the sensor, the sensor pulse train changes the state of monostable 227. Its output, like that of monostable 226, is a 200 microsecond pulse; but this pulse sets latches 228 and 233. The counter 230 is again enabled by the Q output from latch 228, and the Q output from monostable 233 closes the 'lamp off' switches (e.g., 217 in FIG. 13) so that the 'lamp off' op-amps (e.g., 211 in FIG. 13) start integrating the lamp "off" signal. At the end of the count, the latches 228 and 229 are reset by the counter 230, and the 'lamp off' switches are opened. The clock resets and the toggle 232 changes state. It will be observed that the periods of lamp "on" integration and lamp "off" integration are controlled by a common counter 230 which accumulates pulses from a common clock 231. Because the counter 230 is started by a signal independent of the clock, there is a possibility of starting intermediate successive clock pulses by one count period and at another point in time intermediate successive clock pulses for the next, creating a possible time difference of up to one clock pulse. The period of a single 375 kHz pulse is 2.66 microseconds, however, and a worst case phase shift of one count will cause a percentage error of time measured of 0.03%, of three counts in ten thousand. Even this difference is averaged out over several integration times so that its net effect is substantially lower.

As stated before, the toggle 232 changes state after every count period, synchronizing to the frequency of the shutter disk 4 to indicate the beginning of the transition times of the shutter. This timing is very important to the reset electronics because it is during the lamp transition time (when no signal is being integrated), that the op-amp integrators must be reset.

In the single channel shown in FIG. 1, there are seven integrators; two each for the 2100 Hz (66, 67) and 700 Hz (53, 54) signals and three (33, 34, 35) for the 500 Hz signals. These integrators require resetting after one full integration cycle and just after the information has been read into the data gathering, converting, and storage equipment 52 (FIG. 1).

Figure 17:
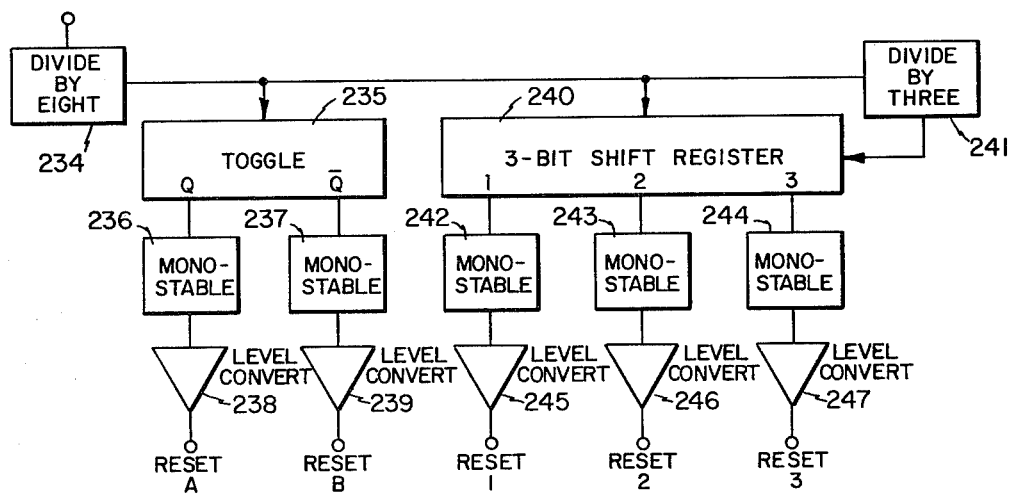
FIG. 17 is a block diagram of certain reset logic employed in the system of FIG. 1.

FIG. 17 is a simplified block diagram of the integrator reset electronics. The input comes from the sync output of the toggle 232 (FIG. 16). It will be recalled that this signal is synchronized to change states at the end if each lamp 'on' or 'off' period (i.e., just before lamp transition time).

The 700 Hz and 2100 Hz integrators use the same reset signals, 'A' and 'B'. They originate from a divide-by-eight counter 234, which issues one pulse to a toggle 235 for every eight pulses it receives. The toggle's outputs, Q and Q̄, trigger monostables 236, 237, respectively, on their low to high transitions. The monostables 236, 237 are triggered, then, every sixteen counts of the sync signal, but they are offset by eight counts. The monostable outputs are 1.0 millisecond pulses (just shorter than the shutter transition time). These pulses are converted from their logic levels to reset switching levels by op-amp level converters 238, 239 and applied to the 700 Hz and 2100 Hz reset switches (e.g., switches 214, 215 of FIG. 13). Thus these integrators are reset every sixteen sync counts during a lamp transition period.

The 500 Hz resets are obtained in a similar manner, except that since there are three integrators for each channel at this frequency, a three-bit shift register 240 is used in conjunction with a divide-by-three circuit 241 to trigger the monostables 242, 243, 244, each triggered after twenty-four counts and staggered from each other by eight counts. The outputs from the monostables 242, 243, 244, are converted to switching levels by the op-amp level convertors 245, 246, 247, respectively, and applied to the appropriate integrator reset switches.

While the principles of the invention have now been made clear in an illustrative embodiment, there will be immediately obvious to those skilled in the art many modifications of structure, arrangements, proportions, the elements, materials and components, used in the practice of the invention which are particularly adapted for specific environments and operating requirements without departing from those principles.

What is claimed is:

1. An airborn mineral exploration system carried by an aircraft comprising:
   (A) a source of downwardly directed ultraviolet light;
   (B) pulsing means for causing said source to alternately issue a beam of ultraviolet light and issue no ultraviolet light;
   (C) lens means for collecting fluorescent light emanating from targets on the ground within the field of view beneath the aircraft, which fluorescent light is issued in response to stimulation by the ultraviolet light from said source and in synchrony with the pulsations thereof;
   (D) at least one chopper means disposed to chop the fluorescent light signals received from the ground targets and gathered by said lens;
   (E) filter means for splitting the chopped fluorescent light signals into a plurality of color bands falling within the visible and infrared spectrum;
   (F) light sensing and amplifying means disposed to separately sense and amplify target signal components falling within each said color band;
   (G) at least one narrow band pass filter means coupled to the output of said light sensing and amplifying means, said narrow bandpass filter means being tuned to the frequency of said at least one chopper means to thereby reject all signal components outside a narrow band centered at the chopper frequency;
   (H) detector means coupled to the output of said narrow band filter means for changing the signal issued therefrom to an analagous d-c signal;
   (I) integrator means for receiving and integrating said d-c signal, said integrator means including:
      (i) a first integrator for receiving and integrating said d-c signal when said source is issuing a beam of ultraviolet light;
      (ii) first switch means for connecting said first integrator to the output of said detector means when said source is issuing a beam of ultraviolet light;

(iii) a second integrator for receiving and integrating said d-c signal when said source is not issuing a beam of ultraviolet light;

(iv) second switch means for connecting said second integrator to the output of said detector means when said source is not issuing a beam of light; and (v) a subtraction circuit for subtracting the d-c signal accumulated by said second integrator from the d-c signal accumulated by said first integrator to obtain an output d-c signal representing only sensed fluorescent light which has responded to said source and from which noise has been stripped; and (J) timing means for synchronizing said first and second switch means with the respective periods during which said source issues and does not issue an ultraviolet beam.

2. The airborne mineral exploration system of claim 1 which includes:

(A) a plurality of chopper means disposed and adapted to chop the fluorescent light signals received from the ground targets and gathered by said lens at a corresponding plurality of frequencies;

(B) a corresponding plurality of narrow bandpass filter means each respectively tuned to a unique one of said corresponding plurality of frequencies; and (C) at least one integrator means for receiving and integrating d-c signals analagous to the signals passing through each of said bandpass filter means.

3. The airborne mineral exploration system of claim 1 or 2 which includes a plurality of integrator means for receiving and integrating each said d-c signal, said timing means controlling respective reset means in said integrators to reset said integrators at staggered intervals whereby the output d-c signals from respective subtraction circuits of said plurality of integrators means represent overlapping, temporally spaced target signals.

4. The airborne exploration system of claim 1 in which said source includes:

(A) a lamp;

(B) a reflector positioned and configured to concentrate the light issued by said lamp into a rectangular beam; and (C) a filter disposed in said beam, said filter having a passband characteristic falling within the ultraviolet portion of the spectrum.

5. The airborne exploration system of claim 4 in which said filter comprises a pair of spaced apart quartz panels between which a fluid having a passband characteristic falling within the ultraviolet is circulated.

6. The airborne exploration system of claims 1, 4, or 5 in which said pulsing means comprises a rotating shutter disc adapted to alternately block and allow to pass the light from said source.

* * * * *